UNITED STATES PATENT OFFICE.

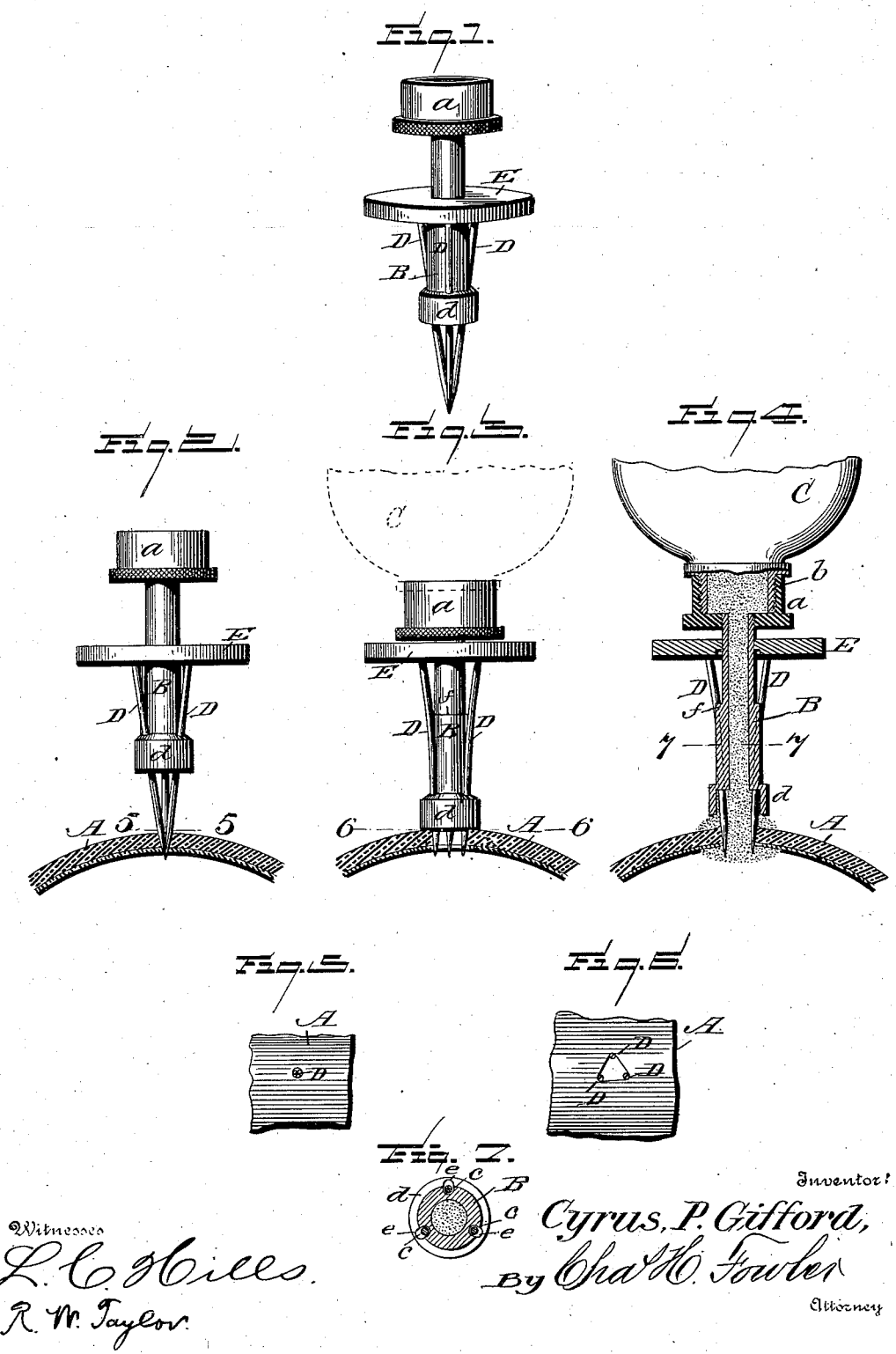

CYRUS P. GIFFORD, OF ERIE, PENNSYLVANIA.

TOOL FOR REPAIRING RUBBER FABRICS.

SPECIFICATION forming part of Letters Patent No. 655,222, dated August 7, 1900.

Application filed January 10, 1900. Serial No. 957. (No model.)

*To all whom it may concern:*

Be it known that I, CYRUS P. GIFFORD, a citizen of the United States, residing at Erie, in the county of Erie and State of Pennsylvania, have invented certain new and useful Improvements in Devices or Tools for Repairing Rubber or other Fabrics; and I do hereby declare that the following is a full, clear, and exact description of the same, reference being had to the annexed drawings, making a part of this specification, and to the letters of reference marked thereon.

The present invention has relation to that class of tools or devices used for the purpose of plugging holes in rubber fabrics, such as hollow or pneumatic bicycle or other vehicle tires; and the invention consists in providing a simple and practical as well as easily-operating device whereby the puncture or hole in the hollow tire or other rubber fabric may be conveniently and expeditiously repaired, substantially as shown in the drawings and hereinafter described and claimed.

Figure 1 of the drawings is a perspective view of a repairing tool or device constructed in accordance with my invention; Fig. 2, a side elevation thereof, showing the points of the expanding rods or needles entering the puncture or hole in the rubber fabric; Fig. 3, a similar view showing the points of the rods or needles expanded or spread out laterally to enlarge the puncture in the fabric to admit the discharge of the rubber cement or other material used for repairing the puncture. Fig. 4 is a sectional elevation of the repairing tool or device, showing the cement deposited in the opening of the fabric to close the same; Fig. 5, a sectional view taken on line 5 5 of Fig. 2; Fig. 6, a similar view taken on line 6 6 of Fig. 3; Fig. 7, a sectional view taken on line 7 7 of Fig. 4.

In the accompanying drawings, A represents a portion of a rubber bicycle or other hollow tire for vehicles or any elastic fabric that requires repairing, the same being shown to better illustrate the use of my improved repairing tool or device.

The tool or device consists in part of a discharge-tube B of any suitable length and diameter and provided at its upper end with an interior screw-threaded coupling $a$ or other suitable means provided for connecting to the tube a suitable air-forcing bulb C, of any preferred construction. Where the screw-threaded coupling $a$ is used, the bulb is provided with a screw-threaded neck $d$ to engage the screw-threaded coupling, as shown in Fig. 4 of the drawings. Upon the outer periphery of the discharge-tube D are formed grooved guides $c$, as shown in Fig. 7 of the drawings, and the lower end of the tube B is cup-shaped, as shown at $d$, and has a plurality of holes $e$, through which extend the lower ends of suitable needles or rods D, which needles or rods are attached at their upper ends to a suitable plunger-head E. The discharge-tube B extends up through a central hole in the plunger-head E and forms a guide therefor, the circumferential shoulder $f$ on the tube forming a stop for the plunger-head to limit its downward movement.

The needles or rods D are pointed at their ends, and any suitable number may be used, as found desirable. Said needles or rods when contracted, as shown in Fig. 2 of the drawings, form together a single tapering point adapted to easily enter in the puncture or hole in the fabric, and by forcing down the plunger-head E the needles or rods will be forced to expand or enlarge the puncture to admit the cement or other liquid material used, as shown in Figs. 3 and 4 of the drawings. After the puncture has been expanded or enlarged by the expanding or forcing outward of the needles or rods the liquid cement is forced into the orifice in the fabric by compressing the bulb, which will deposit the cement in the puncture or orifice by atmospheric pressure and when the cement is dry will effectually close the opening in the pneumatic tire or other rubber fabric requiring repairing or mending.

It will be noticed that the needles or rods D are connected to the plunger-head E some distance from the center thereof, while the holes $e$ in the cup-shaped end of the discharge-tube B describe a circle whose diameter is much less than the circle described by the upper ends of the needles or rods, thereby producing a spring-like action of the needles or rods when being brought to their normal position, as shown in Fig. 1 of the drawings. These needles or rods may be of any suitable construction and preferably of spring metal and which I prefer to term "expanding" needles or rods, as their purpose is solely to enter the puncture in the fabric and expand the same and hold it so expanded until the liquid cement is deposited therein.

Any suitable and well-known cement-forcing device may be used in place of the air-bulb C, as found most desirable, and any suitable means may be substituted in place of the plunger-head E for connecting together the needles or rods D, whereby they will move simultaneously when forced up or down.

Many changes may be made in the several details of construction without affecting the essential features of the invention and any modifications resorted to as would come within ordinary mechanical skill—such, for instance, as a simple circumferential flange with perforations to take the place of the cup-shaped extension $d$. I wish it also understood that the device or tool may be used for mending or repairing punctures or holes in any kind of rubber or similar fabrics, as I do not confine my invention to bicycle-tires or pneumatic tires in general, but for mending anything for which a device or tool of this character would be found useful.

Having now fully described my invention, what I claim as new, and desire to secure by Letters Patent, is—

1. A tool or device for repairing rubber or other fabrics, consisting of a discharge-tube provided at its upper end with a suitable cement or other liquid forcing device, and at or near its lower end having a plurality of perforations or holes, and a suitable plunger-head and a plurality of pointed rods or needles connecting therewith and extending into and through the perforations or holes whereby the rods or needles are contracted or expanded by the movement of the plunger, substantially as and for the purpose set forth.

2. A tool or device for repairing rubber or other fabrics, consisting of a discharge-tube, having grooved guides upon its outer periphery, a plurality of needles or rods adapted to move in the guides, a plunger-head to which the needles or rods are connected, and a suitable cement or other liquid forcing apparatus connecting with the tube, substantially as and for the purpose specified.

3. A tool or device for repairing rubber or other fabric, consisting of a discharge-tube, a cement or other liquid forcing apparatus connecting therewith, guide-grooves upon the outer periphery of the tube, said tube having a cup-shaped lower end with perforations therein, and a plurality of needles or rods extending through the perforations and engaging the guide-grooves, and a suitable plunger-head connecting the upper ends of the needles or rods, substantially as and for the purpose set forth.

In testimony that I claim the above I have hereunto subscribed my name in the presence of two witnesses.

CYRUS P. GIFFORD.

Witnesses:
L. L. GIFFORD,
N. B. JONES.